United States Patent
Shi et al.

(10) Patent No.: US 11,774,044 B1
(45) Date of Patent: Oct. 3, 2023

(54) COMPOSITE PIPELINE FOR TRANSPORTING HYDROGEN AND METHOD FOR MONITORING HYDROGEN LEAKAGE

(71) Applicant: ZHEJIANG UNIVERSITY, Zhejiang (CN)

(72) Inventors: Jianfeng Shi, Zhejiang (CN); Yutong Yuan, Zhejiang (CN); Jinyang Zheng, Zhejiang (CN); Riwu Yao, Zhejiang (CN); Zhoutian Ge, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/160,698

(22) Filed: Jan. 27, 2023

Related U.S. Application Data (63) Continuation of application No. PCT/CN2022/141789, filed on Dec. 26, 2022.

(30) Foreign Application Priority Data

Mar. 29, 2022  (CN) .......................... 202210315029.3

(51) Int. Cl.
*F17D 5/04*  (2006.01)
*G01M 3/04*  (2006.01)
(Continued)

(52) U.S. Cl.
CPC .............. *F17D 5/06* (2013.01); *F16L 59/147* (2013.01); *F17D 5/005* (2013.01)

(58) Field of Classification Search
CPC .... F16L 59/147; F17D 5/00–06; F17D 5/005; G01N 15/00; G01N 15/08;
(Continued)

(56) References Cited

U.S. PATENT DOCUMENTS

| 5,992,217 A | 11/1999 | Peter et al. |
| 10,386,258 B1 | 8/2019 | David et al. |
| (Continued) | | |

FOREIGN PATENT DOCUMENTS

| CN | 102758973 | 10/2012 |
| CN | 204372558 | 6/2015 |
| (Continued) | | |

OTHER PUBLICATIONS

State Intellectual Property Office of the People's Republic of China, Decision of Rejection Issued in Application No. 2022103150293, dated Jul. 8, 2022, 18 pages.(Submitted with Machine/Partial Translation).

(Continued)

*Primary Examiner* — Nguyen Q. Ha
(74) *Attorney, Agent, or Firm* — Fish & Richardson P.C.

(57) ABSTRACT

Methods, devices, and systems for monitoring hydrogen leakage using a composite pipeline for transporting hydrogen are provided. In one aspect, a system of real-time whole-pipeline monitoring hydrogen leakage includes: a composite pipeline including a plastic pipe, a polyurethane foam layer, and a plastic protection layer that are disposed in sequence from inside to outside; joints for connecting sections of the composite pipeline; evacuation pipes; and hydrogen sensors. Each of the evacuation pipes is installed at a corresponding joint of the joints, and each hydrogen sensor is disposed in a corresponding evacuation pipe of the evacuation pipes.

13 Claims, 6 Drawing Sheets

(51) Int. Cl.
*F17D 5/06* (2006.01)
*F16L 59/147* (2006.01)
*F17D 5/00* (2006.01)

(58) Field of Classification Search
CPC . G01N 15/0806; G01N 15/0826; G01M 3/00; G01M 3/04; G01M 3/38
See application file for complete search history.

(56) References Cited

U.S. PATENT DOCUMENTS

| | | | |
|---|---|---|---|
| 11,637,299 B2* | 4/2023 | Morinaga | H01M 8/04664 429/505 |
| 2003/0037596 A1* | 2/2003 | Sorensen | F17D 5/04 73/40.7 |
| 2004/0069361 A1 | 4/2004 | Cheng et al. | |
| 2008/0121643 A1 | 5/2008 | Blencoe et al. | |
| 2010/0122747 A1 | 5/2010 | Blencoe | |

FOREIGN PATENT DOCUMENTS

| | | | | |
|---|---|---|---|---|
| CN | 209294577 U | | 8/2019 | |
| CN | 111120880 B | * | 10/2020 | ............ F17D 5/005 |
| CN | 112576942 | | 3/2021 | |
| CN | 113090958 | | 7/2021 | |
| CN | 113175627 | | 7/2021 | |
| CN | 113188978 A | * | 7/2021 | ......... G01N 15/0826 |
| CN | 113551160 A | | 10/2021 | |
| CN | 214840120 | | 11/2021 | |
| CN | 114413186 | | 4/2022 | |
| DE | 2210173 A1 | | 9/1973 | |
| JP | H04174335 A | | 6/1992 | |
| JP | 2016193810 | | 11/2016 | |
| KR | 20160031759 A | | 3/2016 | |
| WO | WO0025104 A1 | | 5/2000 | |
| WO | WO-2023000027 A1 | * | 1/2023 | ............... F16L 1/12 |
| WO | WO-2023027526 A1 | * | 3/2023 | ............. G01M 3/04 |

OTHER PUBLICATIONS

State Intellectual Property Office of the People's Republic of China, Office Action and Search Report Issued in Application No. 2022103150293, dated May 13, 2022, 19 pages. (Submitted with Machine/Partial Translation).
State Intellectual Property Office of the People's Republic of China, Office Action and Search Report Issued in Application No. 2022103150293, dated Jun. 20, 2022, 23 pages. (Submitted with Machine/Partial Translation).
State Intellectual Property Office of the People's Republic of China, Office Action and Search Report Issued in Application No. 2022103150293, dated Aug. 30, 2022, 8 pages. (Submitted with Machine/Partial Translation).
State Intellectual Property Office of the People's Republic of China, Notification to Grant Patent Right for Invention Issued in Application No. 2022103150293, dated Sep. 27, 2022, 6 pages. (Submitted with Machine/Partial Translation).
International Search Report and Written Opinion in International Appln. No. PCT/CN2022/141789, dated Mar. 21, 2023, 18 pages (with machine translation).

* cited by examiner

COMPOSITE PIPELINE FOR TRANSPORTING HYDROGEN AND METHOD FOR MONITORING HYDROGEN LEAKAGE

CROSS REFERENCE TO RELATED APPLICATIONS

This application is a continuation of International Application No. PCT/CN2022/141789, filed on Dec. 26, 2022, which claims priority to Chinese Patent Application No. 202210315029.3 filed on Mar. 29, 2022. The entire contents of these two applications are incorporated herein by reference.

TECHNICAL FIELD

The present disclosure relates to the field of hydrogen transport pipelines, and in particular to a composite pipeline for transporting hydrogen and a method for monitoring hydrogen leakage.

BACKGROUND

In recent years, the value of hydrogen energy as a new energy source with zero carbon and high efficiency has become more and more prominent in the world energy transformation, and the hydrogen energy industry is promoted. In 2020, hydrogen energy is included in the energy category in China, which indicates an important step forward in the development of hydrogen energy industry.

In the hydrogen energy industry, the four very important processes are hydrogen production, hydrogen storage, hydrogen transportation and hydrogen use. The hydrogen transportation is an important process in the hydrogen energy industry, and a pipeline is an important way to realize large-scale and long-distance transportation.

Currently, medium/high pressure pipelines are more routinely used in the transport field to transport hydrogen and are constructed as dedicated lines. Seamless metal pipes are commonly used for the pipelines for transporting hydrogen, and seamless steel pipes are generally used. A steel material of the pipelines used for hydrogen pipelines includes X42, X52, X56, X60, X60, X70 and X80. However, alloying elements such as Carbon (C), Manganese (Mn), and Chromium (Cr) enhance the hydrogen embrittlement sensitivity of low-alloy steels. Also, the higher the hydrogen pressure and the higher the strength of the material, the more pronounced hydrogen embrittlement and hydrogen cracking will be. In addition, Monel alloy is used to manufacture the hydrogen transport pipelines with excellent physical properties of high strength, high corrosion resistance and wear resistance, but for long-distance hydrogen transport, Monel alloy pipelines are technically complicated and too costly to be mass-produced.

Since a hydrogen molecule is small, hydrogen diffusion is extremely fast, and the hydrogen is odorless, colorless, tasteless, and has an extremely wide range of explosion limit (4% to 75.6%), and the minimum ignition energy of hydrogen is only 0.017 mJ, the following problems exist when the hydrogen is transported by the pipeline. The diffusion loss of hydrogen exists at the pipeline connection, and the diffusion loss of hydrogen is currently about three times that of natural gas. Since hydrogen transport requires high purity, it is not appropriate to add other gases to the hydrogen to make the transportation gas visible and audible, once the hydrogen leaks, the hydrogen will quickly escape into the air directly from the leak position, which can easily lead to the situation that the hydrogen concentration at the leak position is too low to be monitored by the sensor, and it is difficult for workers to quickly detect the leakage and repair the pipeline. Since the lower explosion limit of hydrogen is low, it is easy to form explosive mixture when the hydrogen leaks into the air, and it is very easy to burn and explode in case of open fire, high temperature and high heat. Therefore, in the hydrogen transport pipeline, it is necessary to install a system that can detect hydrogen leakage in the whole-pipeline in real time. To solve this problem, many scholars are conducting research and improvement from different perspectives, such as improving the speed and accuracy of hydrogen detection, optimizing the structure of pipeline to visualize hydrogen leakage, etc. However, most of the research is at the laboratory stage. For example, in the Chinese patent application entitled "a detecting method of gas transport pipeline safety prevention and control" (CN 113090958A), both the generator and the audio detection device are disposed inside the pipeline, there is the risk of generating electric sparks, and the leakage of a certain section can be only determined, but the precise position of the leakage is not determined, and the installation process is complicated and the practical application is difficult. In the Chinese patent application entitled "a fully immersed and fully enclosed safe hydrogen transport pressure pipeline" (CN 214840120U), the hydrogen transport pipeline is a metal pipe, which may cause hydrogen embrittlement, the structure of the pipeline is complex, and the water quality in the water storage pipeline (non-purified water may corrode the metal pipeline) is high, and thus this hydrogen transport pipeline is difficult to be achieved.

At present, the existing technologies of monitoring pipeline leakage include the following three types: nondestructive detecting, condition monitoring, and leakage monitoring.

However, there are certain barriers to various technologies. Common nondestructive detecting technology includes ultrasonic detecting, X-ray or γ-ray detecting, magnetic particle detecting, and infiltration detecting, etc., these detection methods can not realize real-time monitoring and determine a specific position of the defect, in addition, the ultrasonic detecting cannot detect surface or near-surface defects, the ray detecting has safety risks and high detecting costs, and the magnetic particle detecting is only applicable to steel pipelines, etc. Common condition detecting technology includes monitoring of temperature, pressure, and flow and other condition parameters. These monitoring technologies can realize real-time monitoring, but the detection accuracy will vary with different device, and it is difficult to reach the detection accuracy of hydrogen leakage in trace quantities. The leakage monitoring can be realized by arranging gas sensors on the ground, but this method can only be fixed-point monitoring, since the hydrogen has the characteristics of rapid diffusion, the concentration of leaked hydrogen is too low after diffusion, and the sensors are difficult to achieve such high sensitivity, and the leakage cannot be detected in time.

Based on the above background technology, it is necessary to improve the safety and effective transport of hydrogen and the real-time whole-pipeline leakage monitoring of hydrogen transport pipeline.

SUMMARY

Implementations of the present disclosure provides a composite pipeline for transporting hydrogen and a system and a method for real-time whole-pipeline monitoring hydrogen leakage to achieve effective and safe transport of hydrogen and real-time whole-pipeline leakage monitoring of the hydrogen transport pipeline, which can overcome the deficiencies in the related art.

One aspect of the present disclosure features a composite pipeline for transporting hydrogen. The composite pipeline includes a plastic pipe, a polyurethane foam layer and a plastic protection layer disposed in sequence from inside to outside. The plastic pipe is disposed in an inner layer of the composite pipeline and can be manufactured by a plastic extruder; the polyurethane foam layer is wrapped around an outer side of the plastic pipe; and the plastic protection layer is manufactured by the plastic extruder, and is wrapped around an outer side of the polyurethane foam layer.

In the present disclosure, a more achievable composite structure is used to achieve safe hydrogen transport by optimizing the pipe structure. A polyethylene (PE) material is more stable and adapted to transport hydrogen, the PE material exposed to hydrogen has the same result as that exposed to air, and the plastic pipe is manufactured at a lower cost and with mature manufacturing technology, the hydrogen is gathered by foaming polyurethane, and the polyurethane foam layer has a larger porosity. Therefore, the exuded or leaked hydrogen can be effectively contained, and the gathering of hydrogen can be achieved to avoid the rapid diffusion of hydrogen to the outside air due to the rapid escape of hydrogen, as well as the failure to detect the leakage due to the low hydrogen concentration near the pipeline. The plastic protection layer effectively avoids the failure to determine the hydrogen escape point and ensures the integrity of the internal structure. The diffusion of hydrogen is alleviated, the loss of hydrogen transportation caused by leakage is reduced, the leakage of hydrogen into the air is also alleviated, and the safety factor is improved. In addition, the evacuation pipe is determined as the hydrogen escape port to realize the emission of hydrogen, and the rapid and effective detection of hydrogen concentration is achieved through the hydrogen sensor.

The plastic pipe may be a polyethylene pipe, a nylon pipe or a reinforced plastic pipe, etc. In some examples, the plastic pipe is a polyethylene pipe such as a high-density polyethylene pipe like a PE100 material. High-density polyethylene represents polyethylene with a density higher than a threshold (e.g., 0.941 g/cm$^3$). In some examples, the high-density polyethylene has a density in a range from 0.941 g/cm$^3$ to 0.960 g/cm$^3$.

The polyurethane foam layer may be manufactured by mixing and foaming poly diphenylmethane diisocyanate (MDI) and polyether.

Optionally, the plastic protection layer is a polyethylene material, e.g., high-density polyethylene.

Optionally, the plastic protection layer, with a thickness of between 4 to 10 mm, can be used to protect a polyurethane insulation layer from mechanical hard objects, corrosion and water resistance, and to bear soil pressure.

Optionally, a thickness of the polyurethane foam layer can be calculated according to the formula, the thickness=(an inner diameter of an outer pipe−an outer diameter of an inner pipe)/2, and the range of the thickness can ensure the effective gathering of hydrogen without affecting the overall thickness of the pipeline.

Optionally, manufacturing the composite pipeline for transporting hydrogen includes: manufacturing the plastic pipe by a plastic extruder, where each section of the plastic pipe is 12 m; manufacturing the plastic protection layer by a plastic extruder, where each section of the plastic protection layer is 12 m, and the plastic protection layer encases and protects an inner structure; and taking the plastic pipe as an inner pipe and the plastic protection layer as an outer pipe, and coaxially fixing and obliquely arranging the inner pipe and the outer pipe, where a plug is provided between an end of the inner pipe and an end of the outer pipe, polyurethane components are immediately mixed by a foaming device and injected into a annular space between the inner pipe and the outer pipe through a spray gun, the annular space is fully filled to complete injection foaming, and the polyurethane foam layer is demolded after being stably shaped.

Another aspect of the present disclosure features a system of real-time whole-pipeline detecting hydrogen leakage. The system includes the composite pipe of the present disclosure including a plastic pipe, a polyurethane foam layer and a plastic protection layer disposed in sequence from inside to outside, the plastic pipe includes a PE100 material, the polyurethane foam layer is manufactured by mixing and foaming poly diphenylmethane diisocyanate and polyether with a thickness of (an inner diameter of an outer pipe minus an outer diameter of an inner pipe)/2, the plastic protection layer includes a high-density polyethylene material with a thickness between 4 and 10 mm. The system further includes joints for connecting sections of the composite pipeline, evacuation pipes, and fiber optic hydrogen sensors. Manufacturing the system includes: forming the joints of the composite pipeline by welding the plastic pipe as an inner layer; peeling off an outer layer, and connecting the inner layer by electrothermal melting; coating with a polyurethane foam layer; wrapping a plastic protection layer as an outer layer; and installing the evacuation pipes, and installing the hydrogen sensors in the evacuation pipes. the evacuation pipe and plastic protection layer are manufactured from the same material. The hydrogen collected by the polyurethane foam layer can be released from the evacuation pipe, the positioning release of leaking hydrogen is realized. The hydrogen sensor can be a fiber optic hydrogen sensor, and can quickly detect a hydrogen concentration and an ambient temperature, and the system including all fiber optic hydrogen sensors can realize real-time whole-pipe detecting of hydrogen leakage.

The hydrogen sensor of the present disclosure can also be other types of sensors, such as the hydrogen sensor of wireless transmission mode.

In the present disclosure, the evacuation pipe has a diameter of 10 mm to 15 mm, the evacuation pipe is installed at a joint of each composite pipeline, a bottom of the evacuation pipe is 2 mm deep into the polyurethane foam layer, a top of the evacuation pipe is more than 1.5 m above a ground, the hydrogen sensor is installed in each evacuation pipe, the sensing probe is installed at a distance of 1 m from the bottom of the evacuation pipe.

Another aspect of the present disclosure features a method for real-time whole-pipeline detecting of a composite pipeline for transporting hydrogen, including: numbering each hydrogen sensor sequentially starting from "1" at an inlet end of a hydrogen transport network to a last hydrogen sensor at an outlet end of the hydrogen transport network; plotting two coordinate systems (a first coordinate system and a second coordinate system) through an origin, where a vertical axis of the first coordinate system represents a hydrogen concentration and a horizontal axis of the first coordinate system represents time; a vertical axis of the second coordinate system represents a hydrogen concentration and a horizontal axis of the second coordinate system represents each hydrogen sensor, and each number is marked on the coordinate axis in turn in equal proportion according to a pipe length of each section of the composite pipeline, with "1" coinciding with a coordinate origin; detecting a change in the hydrogen concentration by a hydrogen sensor inside the evacuation pipe, and displaying a specific measured value of the hydrogen concentration and a ambient temperature in a signal receiving and processing device, where, after the composite pipeline is damaged inside, the leakage of hydrogen at a leak position increases, and more hydrogen enters the polyurethane foam layer; and the leaked hydrogen collects in the polyurethane foam layer, more hydrogen spreads along the polyurethane foam layer, and more hydrogen diffuses in the evacuation pipe near the leak position, and there are small fluctuations in diffusion of hydrogen in other evacuation pipes; outputting the hydrogen concentration of each measurement point in the composite pipeline over a period of time and outputting the hydrogen concentration of all measurement points at the same time; establishing a first curve of hydrogen concentration over time based on the hydrogen concentration at different times of the same measurement point, and establishing a second curve of hydrogen concentration in an overall pipeline (linear fitting of curve between two measuring points) based on the hydrogen concentration at each measurement point at the same time; and determining whether there is a leakage according to a jump of the first curve and the second curve, and in response to determining that there is a leakage, outputting an alarm by an alarm and recording, by an alarm, a corresponding time to find out a specific leak position.

Compared with the related art, the techniques implemented in the present disclosure provide several technical and beneficial effects and advantages, some of which are described as below.

The techniques optimize the structure of the pipeline for transporting hydrogen, and adopts a three-layer composite structure. The inner layer is the plastic pipe made of polyethylene, the middle layer is the polyurethane foam layer, and the outer layer is the plastic protection layer made of high-density polyethylene. Each of the layers has different functions. The inner layer of the pipeline is a pressure-bearing pipeline and has the advantages of good flexibility and corrosion resistance, and the plastic material is more stable and adapted to transport hydrogen. The polyurethane foam layer as the middle layer has large porosity, and can absorb hydrogen and realize the gathering of hydrogen. The hydrogen is gathered by foaming polyurethane, and the polyurethane foam layer has a larger porosity. Therefore, the exuded or leaked hydrogen can be effectively contained, and the gathering of hydrogen can be achieved to avoid the rapid diffusion of hydrogen to the outside air due to the rapid escape of hydrogen, as well as the failure to detect the leakage due to the low hydrogen concentration near the pipeline. The plastic protection layer effectively avoids the failure to determine the hydrogen escape point and ensures the integrity of the internal structure.

The techniques can arrange sensors at specific positions to form a detecting system, such that the goal of real-time whole-pipeline detecting of a composite pipeline for transporting hydrogen is achieved. The evacuation pipe is installed at the joint of each pipeline, and a hydrogen sensor is installed at a fixed height of each evacuation pipe. The evacuation pipe provides a defined escape position for the hydrogen, and the hydrogen sensor provides the hydrogen concentration at different positions and detects the ambient temperature. A vertical comparison (time sequence) allows the hydrogen concentration curve at each evacuation pipe to be derived over time, and a horizontal comparison (sensor position) allows the specific leak position of the pipeline to be determined.

While realizing the real-time whole-pipeline detecting of the pipeline for transporting hydrogen, the composite pipeline for transporting hydrogen provided by the present disclosure has the advantages of light weight, good flexibility, hydrogen corrosion resistance, high safety, good insulation performance and long service life, etc. In addition, the sensor has the advantages of simultaneous detecting of hydrogen concentration and ambient temperature, high sensitivity and fast transport, etc. The above advantages ensure the safe transportation of hydrogen.

Reference numerals are listed as follows: plastic pipe 101; polyurethane foam layer 102; plastic protection layer 103; joint 201 of the composite pipeline; evacuation pipe 202; fiber optic hydrogen sensor 301; probe 401, 402, 403, . . . , 409 of a fiber optic hydrogen sensor; laser source 410; signal receiving and processing device 411; and leak position 801.

DETAILED DESCRIPTION OF THE EMBODIMENTS

The present disclosure is described in further detail below in conjunction with the accompanying drawings, and it will be noted that the following embodiments are intended to facilitate the understanding of the present disclosure and do not limit it.

Figure 1:
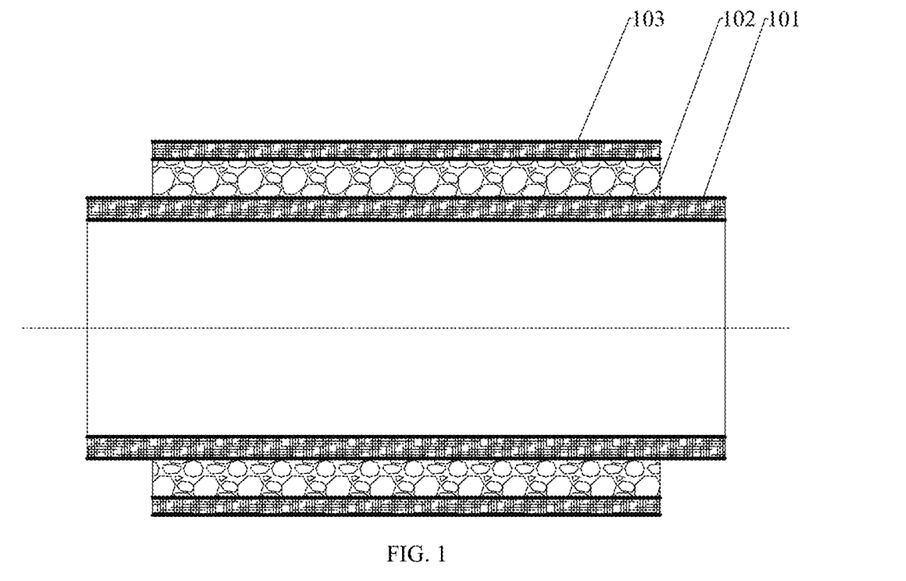
FIG. 1 is a schematic structural diagram a composite pipeline for transporting hydrogen according to an embodiment of the present disclosure.

As shown in FIG. 1, the composite pipeline for transporting hydrogen according to an embodiment of the present disclosure includes a plastic pipe 101, a polyurethane foam layer 102, and a plastic protection layer 103 disposed in sequence from inside to outside.

The process of manufacturing the composite pipeline for transporting hydrogen includes the following steps.

First, the inner plastic pipe 101 is manufactured. In some embodiments, a heating temperature of each section of a barrel and a head of a plastic extruder is set, with an overall temperature within 175° C.-225° C., and the adjustment range of heating temperature of each section is ±10° C. After reaching the preset temperature, the constant temperature is maintained for 90-150 minutes. When the heating temperature of each section of the barrel and the head all reach the preset temperature (±2° C.), and there is no significant change in the constant temperature time, the plastic extruder is started. A host screw is first started to run at low speed (5-10 r/min), and a feeder screw is then started to feed at low speed (5-10 r/min). A starting material is first added, and then a conventional production material (e.g., PE100) is added after the extrusion is normal to formally extrude the pipe. After the extruded pipe is pulled normally, a vacuum pump on a vacuum sizing water tank is started, and the pipe through a sizing cylinder sleeve is adsorbed on the inner wall of the sizing cylinder sleeve in the vacuum environment. A vacuum degree is adjusted according to a word order deviation of the outer diameter of the pipe. Generally, the vacuum degree for sizing is controlled within the range of −0.01 MPa to −0.06 MPa. The qualified pipe after sizing is pulled by the tractor out of the sizing cylinder sleeve and enters a cooling water tank. After spray cooling or immersion cooling, the pipe is pulled out of the vacuum sizing water tank and the cooling water tank, and transported to the printer through a tractor track, and finally to a planetary cutter, and the pipe is cut according to 12 m per section. Next, the plastic protection layer 103 is manufactured. Specifically, the plastic protection layer 103 is manufactured by the plastic extruder, the specific process is the same as the plastic pipe 101, and the plastic protection layer 103 encloses the inner structure. Finally, the polyurethane foam layer 102 is manufactured by a high-pressure foaming machine as the middle layer. The plastic pipe 101 is used as the inner pipe, and the plastic protection layer 103 is used as the outer pipe. The inner pipe 101 and the outer pipe 103 are coaxially fixed and obliquely arranged. A plug is provided between an end of the inner pipe and an end of the outer pipe. A spray gun is inserted into an annular space between the inner pipe 101 and the outer pipe 103 from an opening on the plug at the higher end. The two components, poly Methylene diphenyl diisocyanate (MDI) and polyether, are instantly mixed through the foaming device and injected into the annular space through the spray gun. The spray gun is controlled to complete the injection foaming while reversing, and the polyurethane foam layer 102 is demolded after being stably shaped.

Figure 2:
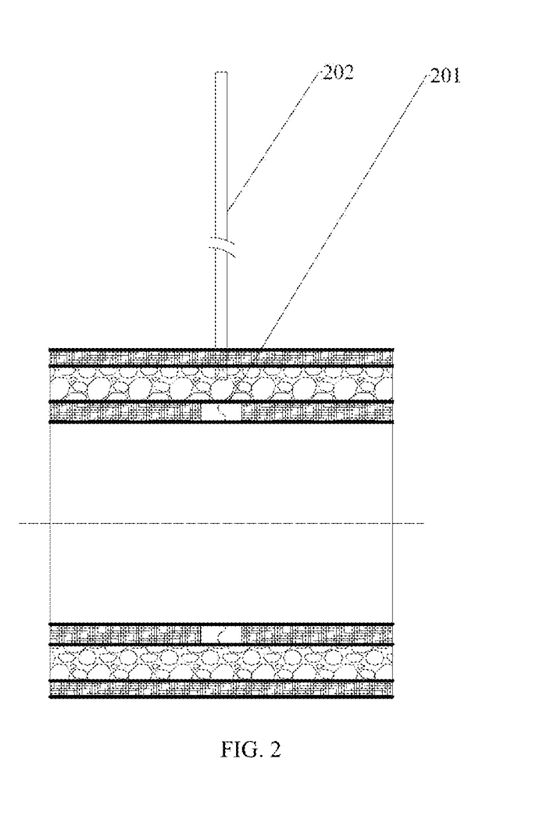
FIG. 2 is a diagram illustrating a system for monitoring hydrogen leakage at a joint of a composite pipeline according to an embodiment of the present disclosure.

FIG. 2 is a diagram illustrating a system for detecting hydrogen leakage at a joint 201 of two pipelines according to an embodiment of the present disclosure. The pipeline can be the composite pipeline as illustrated in FIG. 1. Firstly, both the plastic protection layer and the polyurethane foam layer at the end of each of the two pipelines are excised by 50 cm with a cutter, then the oxidized layer of the inner plastic or the welding area of the pipeline is scraped by 0.1~0.3 mm, suitable welding parameters are selected, and a welding section of the two pipelines is heated to a certain temperature by a hot melt butt welder to melt them, and then the two pipelines are quickly laminated and a certain pressure is applied until cooling to complete the welding of the inner pipes of the two pipelines. Further, the polyurethane foam layer in the middle is manufactured by the foaming device, and the plastic protection layer as the outer layer is manufactured by the plastic extruder. A circular hole with a diameter of 10-15 mm is cut by the cutter at the upper part of the plastic protection layer in the joint of the pipelines. A bottom of an evacuation pipe 202 is penetrated into the polyurethane foam layer for 2 mm to fix the evacuation pipe 202. The oxidation layer of the evacuation pipe 202 and the cutting area is scraped by 0.1~0.3 mm. Suitable welding parameters are selected, and the inner surface of the cutting area and the outer surface of the evacuation pipe 202 are melted by heating an electric wire on an inner surface of the electric melting pipe fitting of a full-automatic electric melting welding machine. The evacuation pipe 202 can be a plastic welding pipe. Due to the thermal expansion effect of the plastic welding pipe, the evacuation pipe and the cutting area are fused together, and cooled to the required time to complete the welding. Finally, a clamp is used to penetrate into the evacuation pipe, to fix an optical fiber hydrogen sensor at an installation position.

Figure 3:
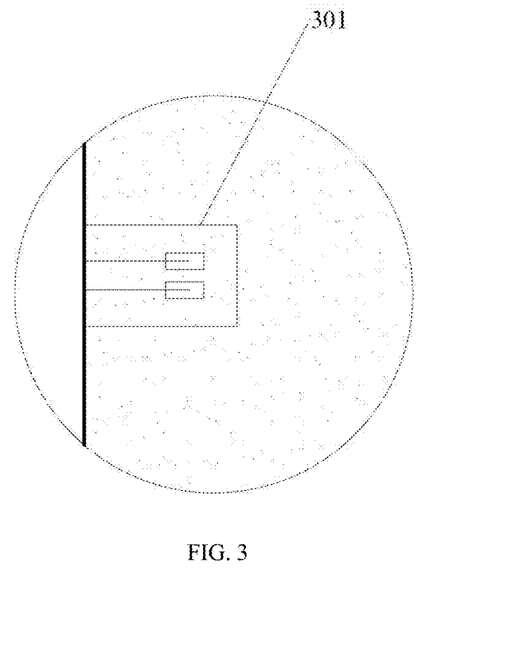
FIG. 3 is a partial enlarged schematic diagram of the installation of fiber optic hydrogen sensor in an evacuation pipe according to an embodiment of the present disclosure.
Figure 4:
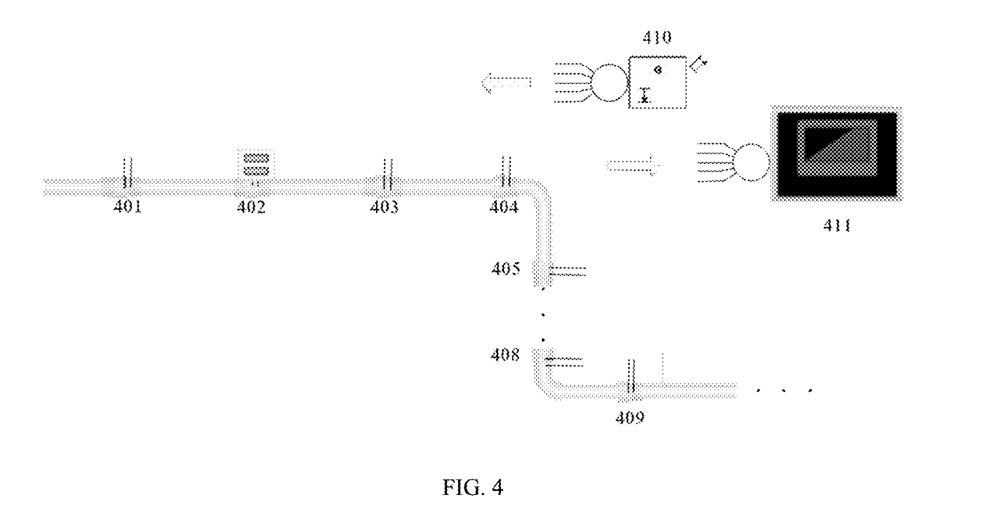
FIG. 4 is a schematic diagram of a hydrogen pipeline with real-time whole-pipeline monitoring according to an embodiment of the present disclosure.

FIG. 3 is a partial enlarged schematic diagram of the installation of fiber optic hydrogen sensor 301 in the evacuation pipe 202 according to an embodiment of the present disclosure. A hydrogen concentration probe and a temperature probe are installed inside each evacuation pipe 202, and each probe is connected to a laser source 410 and a signal receiving and processing device 411 via an optical fiber, as illustrated in FIG. 4. The signal receiving and processing device can be implemented with a computer. Two curves are plotted on the receiving and processing device side. When a jump point (jump value over 10%) occurs in the two curves in the pipeline, the alarm indicates a leak in the pipeline. Next, the worker immediately checks the two curves, when the hydrogen concentration curve measured at a certain position in the pipeline shows a jump (hydrogen concentration increases significantly) and subsequently continues to increase rapidly, the worker further compares and observes the hydrogen concentration curve of the whole-pipeline at the time of the jump, and if only the position shows a jump, and the concentration difference with the surrounding measured positions is large, it can be determined that the pipeline has a leak at the measured position. When the hydrogen concentration curves measured at two positions in the pipeline have different degrees of jump, and the hydrogen concentration curves of the whole-pipeline have jumped only at the two positions at the time of jump, it can be determined that the pipeline between the two measured positions has a leak, and the section of the pipeline is further divided according to the inverse of the ratio of hydrogen concentrations at the two positions to determine the specific position of the leak.

Embodiment I

The composite pipeline of the present disclosure is used as a pipeline for transporting hydrogen, as shown in FIG. 4. Specific parameters of the pipeline are as follows. A nominal diameter of the plastic pipe as the inner layer is 600 mm, an outer diameter of the plastic pipe is 630 mm, and a thickness of the wall of the plastic pipe is 15 mm; a thickness of the polyurethane foam layer as the middle layer is 15 mm; an inner diameter of the plastic protection layer as the outer layer is 660 mm; and a thickness of the plastic protection layer is 10 mm. According to the specific parameters, the composite pipeline is manufactured by a factory production line. First, the inner plastic pipe is manufactured. Specifically, a heating temperature of each section of a barrel and a head of a plastic extruder is set, with the overall temperature within 220° C., and the adjustment range of heating temperature of each section is ±10° C. After reaching the preset temperature, the constant temperature is maintained for 120 minutes. When the heating temperature of each section of the barrel and the head all reach the preset temperature (±2° C.), and there is no significant change in the constant temperature time, the plastic extruder is started. A host screw is first started to run at low speed (10 r/min), and a feeder screw is then started to feed at low speed (10 r/min). A starting material is first added, and then a conventional production material (e.g., PE100) is added after the extrusion is normal to formally extrude the pipe. After the extruded pipe is pulled normally, a vacuum pump on a vacuum sizing water tank is started, and the pipe through a sizing cylinder sleeve is adsorbed on the inner wall of the sizing cylinder sleeve in the vacuum environment. A vacuum degree is adjusted according to a word order deviation of the outer diameter of the pipe. Generally, the vacuum degree for sizing is controlled within the range of −0.01 MPa to −0.06 MPa. The qualified pipe after sizing is pulled by the tractor out of the sizing cylinder sleeve and enters a cooling water tank. After spray cooling or immersion cooling, the pipe is pulled out of the vacuum sizing water tank and the cooling water tank, and transported to the printer through a tractor track, and finally to a planetary cutter, and the pipe is cut according to 12 m per section. Next, the plastic protection layer is manufactured. Specifically, the plastic protection layer is manufactured by the plastic extruder, the specific process is the same as the plastic pipe. Finally, the process of manufacturing the polyurethane foam layer is as follows. The plastic pipe is used as the inner pipe, and the plastic protection layer is used as the outer pipe. The inner pipe and the outer pipe are coaxially fixed and obliquely arranged. A plug is provided between an end of the inner pipe and an end of the outer pipe. The two components, poly Methylene diphenyl diisocyanate (MDI) and polyether, are instantly mixed through the high-pressure foaming device and injected into the annular space between the inner pipe and the outer pipe. The annular space is fully filled to complete the injection foaming, and the polyurethane foam layer is demolded after being stably shaped.

When manufacturing the system of real-time whole-pipeline monitoring hydrogen leakage, a plurality of evacuation pipes with a diameter of 15 mm and a plurality of fiber optic hydrogen sensors with temperature and hydrogen concentration measurement functions are provided. Each fiber optic hydrogen sensor has a respective probe, e.g., 401, 402, 403, . . . , or 409, positioned at a corresponding joint (e.g., the joint 201 of FIG. 2) of the whole-pipeline. The manufacture process of the system of real-time whole-pipeline detecting hydrogen leakage is as follows. Firstly, both the plastic protection layer and the polyurethane foam layer at the end of two sections of the pipeline are excised by 50 cm with a cutter, then the oxidized layer of the inner plastic or the welding area of the pipeline is scraped by 0.2 mm. An operating temperature is set to 220° C. with a temperature error of ±5° C., and a hydraulic system operating pressure is 3 MPa. A welding section of the two sections of the pipeline is heated to the operating temperature by a 400-630 hydraulic butt welder to melt them, and then they are quickly laminated and a certain pressure is applied until cooling to complete the welding of the inner pipes of the two sections. Further, the polyurethane foam layer in the middle is manufactured by the high-pressure foaming device, and the plastic protection layer as the outer layer is manufactured by the plastic extruder. A circular hole with a diameter of 15 mm is cut by the cutter at the upper part of the plastic protection layer in the joint of the pipeline. A bottom of the evacuation pipe is penetrated into the polyurethane foam layer for 2 mm to fix the evacuation pipe. The oxidation layer of the evacuation pipe and the cutting area is scraped by 0.2 mm. The inner surface of the cutting area and the outer surface of the evacuation pipe are melted by heating the electric wire on the inner surface of the electric melting pipe fitting of the full-automatic electric melting welding machine. Due to the thermal expansion effect of the plastic welding pipe, the evacuation pipe and the cutting area are fused together, and cooled to the required time to complete the welding. Finally, a clamp is used to penetrate into the evacuation pipe, to fix the optical fiber hydrogen sensor 301 at an installation position.

Figure 5:
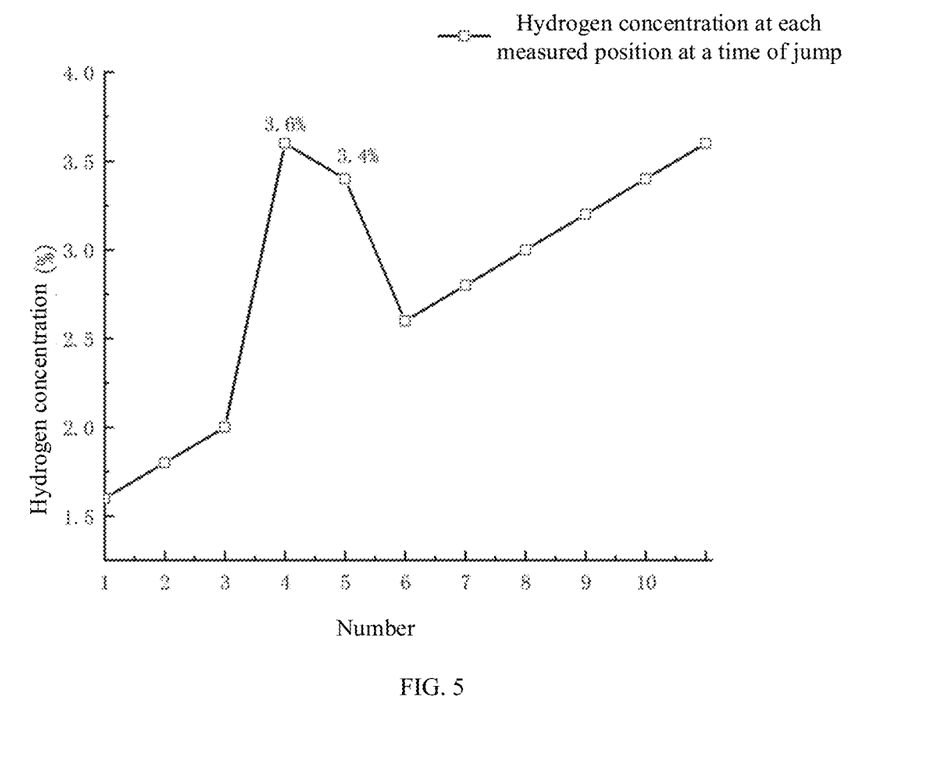
FIG. 5 illustrates a curve of hydrogen concentration at various positions along a whole-pipeline at the $21^{st}$ s in embodiment I of the present disclosure.
Figure 6:
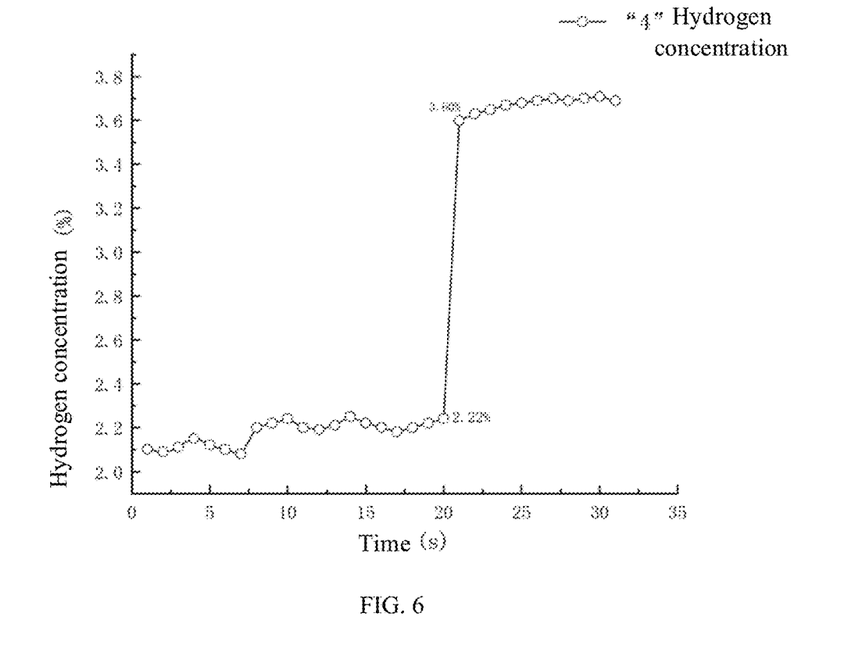
FIG. 6 illustrates a curve of hydrogen concentration over time in the evacuation pipe at a number "4" in the embodiment I of the present disclosure.
Figure 7:
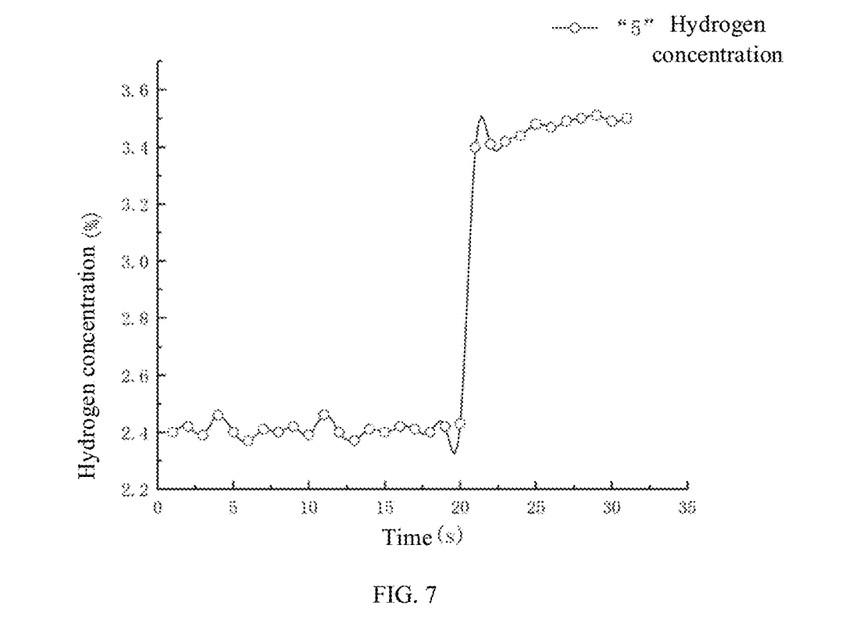
FIG. 7 illustrates a curve of hydrogen concentration over time in the evacuation pipe at a number "5" in the embodiment I of the present disclosure.
Figure 8:
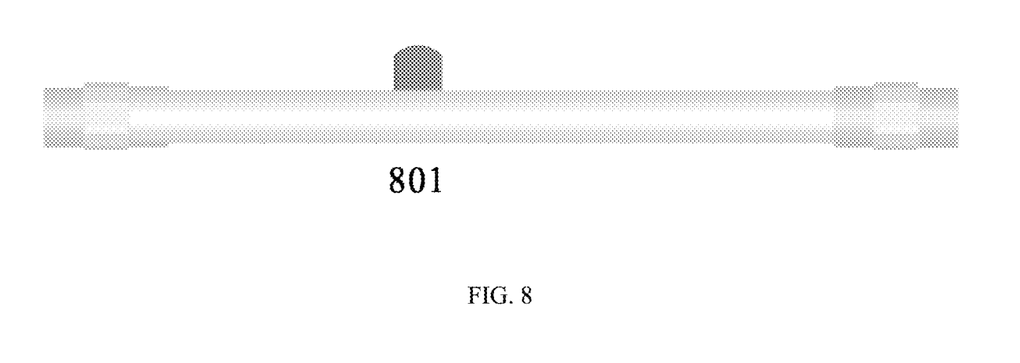
FIG. 8 is a diagram illustrating a leakage position of a section "34" of the pipeline in in the embodiment I of the present disclosure.

The specific conditions of the pipeline for transporting hydrogen are a pressure of 2.0 MPa and a flow rate of about 8417 m³/h. During the operation of pipeline, a worker B1 heard the alarm and checked the hydrogen concentration curve of the signal receiving and processing device at the corresponding time, and found that the device detected a jump in the hydrogen concentration. The worker B1 immediately checked the hydrogen concentration curve of the whole-pipeline at the corresponding time, as shown in FIG. 5, the worker found that the hydrogen concentrations at the fiber optic hydrogen sensors "4" and "5" are significantly higher than the hydrogen concentrations at other positions on both sides. Further, the hydrogen concentration curves over time at the fiber optic hydrogen sensor "4" and "5" are checked, as shown in FIG. 6 and FIG. 7, the worker found that the hydrogen concentrations at the two positions are significantly larger at the $21^{st}$ s, thus it can be determined that the section "4 to 5" of the pipeline has a leak, and the enlarged diagram of the section "4 to 5" is shown in FIG. 8. Due to the homogeneity of the material of the polyurethane foam layer, it can be determined that the escape velocity of hydrogen is basically the same in the leaking section, and the main reason for the difference in concentration between the two positions is the different distance from the leak position. Therefore, the worker B1 immediately divides the section "4 to 5" into two sections from left to right based on the inverse ratio of hydrogen concentration of 3.4%:3.6%, and the separation point is the leak position, for example, a position "801" as shown in FIG. 8.

Embodiment II

Figure 9:
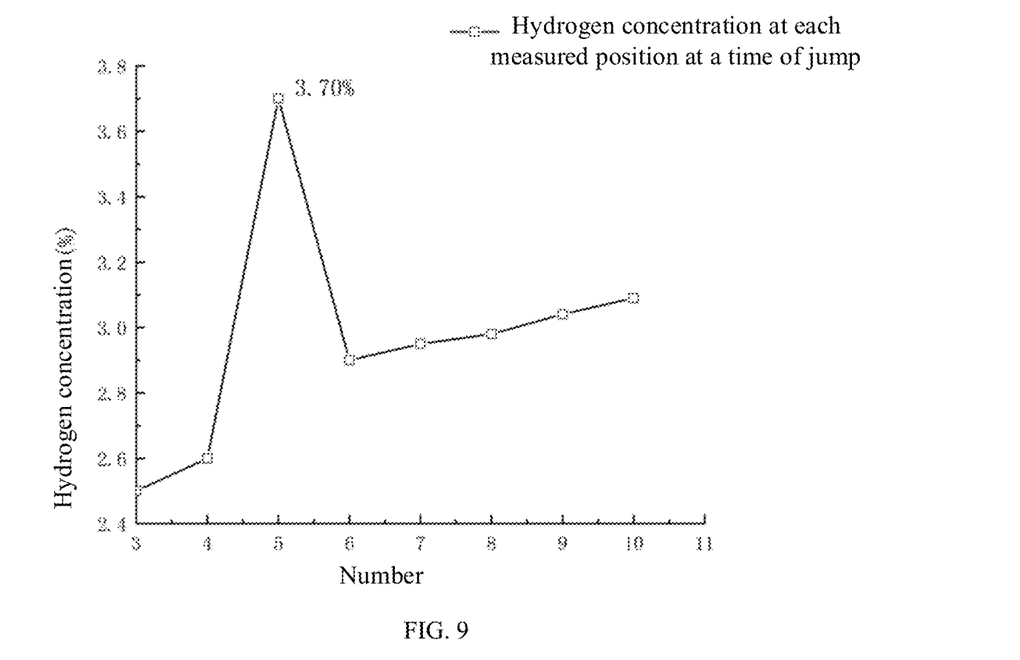
FIG. 9 illustrates a curve of hydrogen concentration at various positions along the whole-pipeline at the $30^{th}$ s in embodiment II of the present disclosure.
Figure 10:
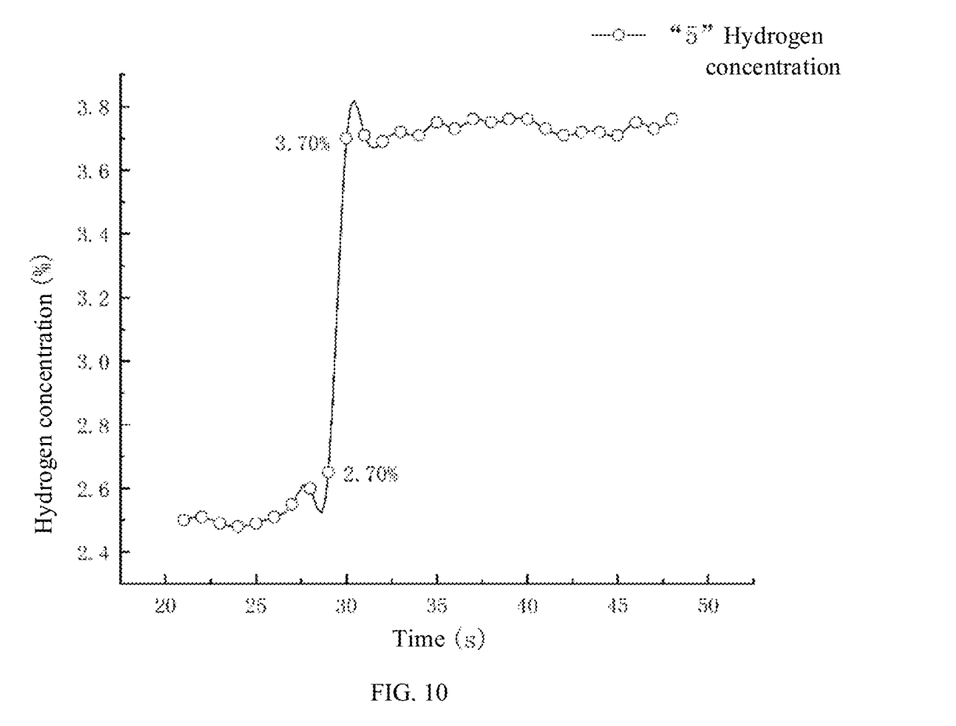
FIG. 10 illustrates a curve of hydrogen concentration over time in the evacuation pipe at a number "5" in the embodiment II of the present disclosure.
Figure 11:
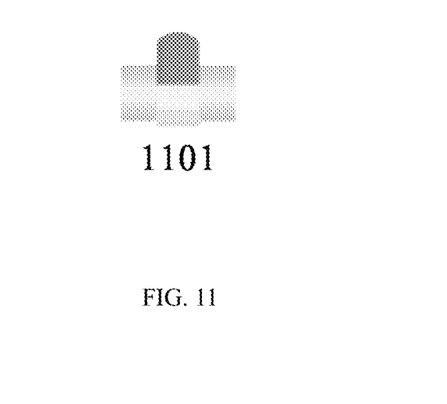
FIG. 11 is a diagram illustrating a leakage position of a joint "5" of the pipeline in the embodiment II of the present disclosure.

The structure of a long-distance hydrogen transport pipeline is shown in FIG. 4, and the specific structural dimensions of the pipeline are as follows. A nominal diameter of the plastic pipe as the inner layer is 300 mm, an outer diameter of the plastic pipe is 325 mm, and a thickness of the wall of the plastic pipe is 12.5 mm. A thickness of the polyurethane foam layer as the middle layer is 10 mm. An inner diameter of the plastic protection layer as the outer layer is 345 mm, and a thickness of the plastic protection layer is 5 mm. The specific conditions for the pipeline to transport hydrogen are as follows. The pressure is 1.8 MPa and the flow rate is about 2160 m³/h. During the operation of pipeline, a worker B2 heard the alarm and checked the hydrogen concentration curve of the signal receiving and processing device at the corresponding time, and found that the device detected a jump in the hydrogen concentration. The worker B2 immediately checked the hydrogen concentration curve of the whole-pipeline at the corresponding time, as shown in FIG. 9, the worker found that the hydrogen concentrations at the fiber optic hydrogen sensors "5" are significantly higher than the hydrogen concentrations at other positions on both sides. Further, the hydrogen concentration curves over time at the fiber optic hydrogen sensor "5" are checked, as shown in FIG. 10, the worker found that the hydrogen concentrations at the two positions are significantly larger at the 30$^{th}$ s, thus it can be determined that the joint "5" of the composite pipeline has a leak, and the specific position is a position "1101" as shown in FIG. 11.

It will be noted that the above embodiments are only more representative examples of the present disclosure. Obviously, the present disclosure is not limited to the above embodiments, but can have many variations. Any simple modifications, equivalent changes and modifications to the above embodiments based on the technical substance of the present disclosure shall be considered to fall within the scope of the present disclosure.

The invention claimed is:

1. A method for real-time whole-pipeline monitoring of a composite pipeline for transporting hydrogen in a hydrogen transport network, the method comprising:

numbering a plurality of hydrogen sensors sequentially starting from "1" for a first hydrogen sensor at an inlet end of the hydrogen transport network to "n" for a last hydrogen sensor at an outlet end of the hydrogen transport network, each hydrogen sensor corresponding to a measurement point in the composite pipeline, wherein n is an integer and represents a number of the plurality of hydrogen sensors, wherein the plurality of hydrogen sensors are arranged at corresponding joints along the composite pipeline, wherein the composite pipeline comprises a plastic pipe, a polyurethane foam layer, and a plastic protection layer disposed in sequence from inside to outside of the composite pipeline, the plastic pipe comprises a polyethylene material, the polyurethane foam layer comprises mixed and foamed poly diphenylmethane diisocyanate and polyether and has a thickness identical to a half of a difference between an inner diameter of the plastic protection layer and an outer diameter of the plastic pipe, and the plastic protection layer comprises a high-density polyethylene material with a thickness between 4 mm and 10 mm, and wherein an evacuation pipe is installed at a joint between adjacent sections of the composite pipeline, and a corresponding hydrogen sensor is installed inside the evacuation pipe;

plotting a first coordinate system and a second coordinate system, wherein a vertical axis of the first coordinate system represents a hydrogen concentration and a horizontal axis of the first coordinate system represents time, wherein a vertical axis of the second coordinate system represents a hydrogen concentration and a horizontal axis of the second coordinate system represents each of the plurality of hydrogen sensors, and each number is marked on the coordinate axis in turn in equal proportion according to a pipe length of each section of the composite pipeline, with "1" coinciding with a coordinate origin;

detecting a change in the hydrogen concentration of each of a plurality of measurement points in the composite pipeline by a corresponding hydrogen sensor inside a corresponding evacuation pipe, and displaying a specific measured value of the hydrogen concentration and an ambient temperature in a signal receiving and processing device, wherein, after the composite pipeline is damaged inside, a leakage of hydrogen at a leak position increases, and more hydrogen enters the polyurethane foam layer; and leaked hydrogen collects in the polyurethane foam layer, more hydrogen spreads along the polyurethane foam layer, and more hydrogen diffuses in the evacuation pipe near the leak position, and there are small fluctuations in diffusion of hydrogen in other evacuation pipes;

outputting the hydrogen concentration of each of the plurality of measurement points in the composite pipeline over a period of time and outputting hydrogen concentrations of the plurality of measurement points in the composite pipeline at a same time;

establishing a first curve of hydrogen concentration over time based on the hydrogen concentration at different times of a same measurement point, and establishing a second curve of hydrogen concentration in an overall of the composite pipeline based on the hydrogen concentrations at the plurality of measurement points in the composite pipeline at the same time; and determining whether there is a leakage according to a jump of the first curve and the second curve, and in response to determining that there is a leakage, outputting an alarm signal, recording a time corresponding to the alarm signal, and determining a specific leak position in the composite pipeline.

2. The method of claim 1, wherein determining whether there is a leakage according to the jump of the first curve and the second curve comprises:

determining that the jump of the second curve is associated with first and second adjacent measurement points;

determining that the first curves of the first and second adjacent measurement points have respective jumps at a same time point; and determining that there is a leakage according to the jump of the second curve and the respective jumps of the first curves.

3. The method of claim 2, wherein determining the specific leak position comprises:

determining the specific leak position in a section between the first and second adjacent measurement points, wherein a ratio of a first distance between the first measurement point and the specific leak position and a second distance between the second measurement point and the specific leak position is inverse to a ratio of a first hydrogen concentration of the first measurement point and a second hydrogen concentration of the second measurement point at the same time point.

4. The method of claim 1, wherein determining whether there is a leakage according to the jump of the first curve and the second curve comprises:

determining that the jump of the second curve is associated with a specific measurement point, determining that the first curve of the specific measurement point has a corresponding jump at a specific time point; and determining that there is a leakage according to the jump of the second curve and the jump of the first curve.

5. The method of claim 4, wherein determining the specific leak position comprises:

determining the specific leak position at the specific measurement point.

6. The method of claim 1, wherein a section between adjacent joints of the composite pipeline is about 12 m.

7. A system of real-time whole-pipeline monitoring hydrogen leakage, comprising:

a composite pipeline comprising a plastic pipe, a polyurethane foam layer, and a plastic protection layer that are disposed in sequence from inside to outside of the composite pipeline, wherein the plastic pipe comprises a polyethene material, the polyurethane foam layer comprises mixed and foamed poly diphenylmethane diisocyanate and polyether and has a thickness identical to a half of a difference between an inner diameter of the plastic protection layer and an outer diameter of the plastic pipe, the plastic protection layer comprises a high-density polyethylene material with a thickness between 4 and 10 mm;

joints for connecting sections of the composite pipeline;
evacuation pipes; and
hydrogen sensors,
wherein each of the evacuation pipes is installed at a corresponding joint of the joints, and each hydrogen sensor is disposed in a corresponding evacuation pipe of the evacuation pipes, and
wherein each of the hydrogen sensors comprises a hydrogen probe and a temperature probe configured to obtain a hydrogen concentration and an ambient temperature.

8. The system of claim 7, wherein a material of the evacuation pipes is same as a material of the plastic protection layer.

9. The system of claim 7, further comprising:
a signal receiving and processing device; and
an alarm,
wherein each of the hydrogen sensors is configured to rapidly transmit a to-be-processed signal to the signal receiving and processing device to convert the to-be-processed signal into specific data.

10. The system of claim 9, wherein each of the evacuation pipes has a diameter in a range from 10 mm to 15 mm.

11. The system of claim 9, wherein, for each of the evacuation pipes,
a bottom of the evacuation pipe is penetrated into the polyurethane foam layer for about 2 mm, and a top of the evacuation pipe is more than 1.5 m above a ground, and
a sensing probe of a corresponding hydrogen sensor is installed in the evacuation pipe and at a distance of 1 m from the bottom of the evacuation pipe, and the sensing probe is remotely connected to the signal receiving and processing device.

12. A method for forming a system of real-time whole-pipeline monitoring hydrogen leakage, the method comprising:
peeling off an outer of sections of a composite pipeline, wherein the composite pipeline comprises a plastic pipe, a polyurethane foam layer, and a plastic protection layer that disposed in sequence inside to outside;
forming joints of the composite pipeline by welding inner pipes of the sections of the composite pipeline, the welded inner pipes forming the plastic pipe of the composite pipeline;
forming the polyurethane foam layer by a foaming device;
forming the plastic protection layer by a plastic extruder;
installing evacuation pipes by melting a bottom of each of the evacuation pipes to a corresponding joint of the joints; and
installing hydrogen sensors in the evacuation pipes, wherein each of the hydrogen sensors is disposed in a corresponding evacuation pipe of the evacuation pipes.

13. The method of claim 12, further comprising manufacturing each section of the composite pipeline, comprising:
manufacturing each section of the plastic pipe by the plastic extruder;
manufacturing each section of the plastic protection layer by the plastic extruder, and the plastic protection layer encases and protects an inner structure; and
manufacturing each section of the polyurethane foam layer by
coaxially fixing and obliquely arranging the section of the plastic pipe as an inner pipe and the section of the plastic protection layer as an outer pipe, wherein a plug is provided between an end of the inner pipe and an end of the outer pipe,
mixing polyurethane components by the foaming device and injecting the mixed polyurethane components into an annular space between the inner pipe and the outer pipe through a spray gun to fully fill the annular space to complete injection foaming, and
demolding the section of the polyurethane foam layer after being stably shaped.

* * * * *